United States Patent [19]

Donnerstag

[11] Patent Number: 5,463,533
[45] Date of Patent: Oct. 31, 1995

[54] VARIABLE DEPTH LOAD CENTER ENCLOSURE

[75] Inventor: Leonard Donnerstag, deceased, late of Atlanta; Rory Donnerstag, executor, Lawrenceville, both of Ga.

[73] Assignee: Siemens Energy & Automation, Inc., Alpharetta, Ga.

[21] Appl. No.: 265,487

[22] Filed: Jun. 24, 1994

[51] Int. Cl.⁶ .................. H02B 1/06; H02G 3/12
[52] U.S. Cl. .................. 361/825; 174/57; 220/3.7; 361/641
[58] Field of Search .................. 248/27.1, 224.2, 248/906; 220/3.7, 3.9, 3.92; 174/57; 361/622, 641, 644, 645, 652, 657, 658, 807, 809, 825; 200/296

[56] References Cited

U.S. PATENT DOCUMENTS

| | | | |
|---|---|---|---|
| 1,345,503 | 7/1920 | Newton | 174/57 |
| 4,062,470 | 12/1977 | Boteler | 220/3.3 |
| 4,971,280 | 11/1990 | Rinderer | 248/229 |
| 5,289,934 | 3/1995 | Smith | 220/3.7 |

FOREIGN PATENT DOCUMENTS 0160440  5/1979  Netherlands .................. 174/57

Primary Examiner—Gerald P. Tolin
Attorney, Agent, or Firm—Donald M. Boles

[57] ABSTRACT

An adjustable depth electrical enclosure is taught. Briefly stated, a load center housing has inverted T shaped slots provided along its exterior. A bracket having an adjusting screw swagged thereto is extended through the T slot so that the bracket can ride back and forth in the vertical portion of the T slot. The adjusting screw is rotatably attached to a flange on the enclosure such that rotation of the screw causes the adjusting bracket to move with respect to the front/rear direction of the enclosure. Thereafter, when the brackets are attached to wall studs, mere adjustment of the adjusting screw allows the enclosure to be moved perpendicular to the wall thereby allowing the enclosure to be accurately flush mounted with the wall material utilized.

18 Claims, 3 Drawing Sheets

5,463,533

VARIABLE DEPTH LOAD CENTER ENCLOSURE

FIELD OF THE INVENTION

This invention relates, generally, to load center enclosures and more particularly to a load center enclosure having a means for varying its distance between its front flange and the finish surface of the wall within which it is mounted.

BACKGROUND OF THE INVENTION

Present day load centers are described as either surface, flush or combination to indicate the manner in which they are mounted and their general construction. Surface mount load centers are designed to mount directly to the finished wall generally by being secured directly at the rear of the box to the finished wall. Accordingly, they do not have any adjusting mechanism to move the enclosure forward or back and do not have an adjustable trim piece for the front of the box. Therefore, the trim piece which is disposed on the front of the box is secured directly to the box.

Flush mount load centers are generally used where a finished appearance is necessary. As such, they are designed to mount between adjacent wall studs. Accordingly, known load center enclosures are generally mounted from inside the box via a knock out which allows a nail, screw or other fastening device to be pushed through the knock out into the wall studs. Unfortunately, it is very typical that the installer will not know the type or thickness of the finished wall or the proposed type or thickness of the wall is changed. As such, flush devices must generally have an adjustable trim. The purpose of this is to give a finished appearance to the load center panel when the front cover is placed thereon as well as to allow the front surface of the metal enclosure to be flush with the surface of the finished wall, thereby providing a fireproof enclosure from the front to the rear of the panel.

Accordingly, it is very important to ensure that the trim is utilized and properly attached or secured to the box and the like. By way of example, finished walls may vary from ⅛ inch to ⅝ inch or more and can sometimes exceed twice or three times that amount if concrete, stucco or double thickness drywall is utilized. Therefore, any trim which is used must be adjustable to compensate for the varying types of wall construction. Moreover, if the enclosure is to far back from the surface of the finished wall, even though the trim may be able to compensate for this distance, the circuit breakers and switching devices contained therein may not be at the proper depth for mating with the trim.

Heretofore, it was possible to adjust the interior base pan upon which the devices were mounted by use of a screw mechanism. However, for cost, installation and other purposes this base pan is now typically plastic and therefore adjustable interiors are not generally used or practical. As such, it is now even more necessary that the trim itself be adjustable.

Accordingly, it is an object of the present invention to produce a load center which may be surface or flush mounted.

It is yet another object of the present invention to produce a load center which may have its dept within the wall in which it is mounted adjustable in order to compensate for varying thickness wall finishes.

Still a further object of the present invention is to produce an adjustable load center enclosure which is simple and inexpensive to change from surface mount to flush mount.

Still a further object of the present invention is to produce an adjustable load center enclosure which does not require different or separate trims, faceplates and the like.

Yet another object of the present invention is to produce an adjustable depth load center enclosure wherein the base pan does not have to be adjustable.

It is yet another object of the present invention to produce an adjustable depth electrical enclosure, comprising an enclosure having opposing sides, a back and a front, at least one mounting bracket for affixing the enclosure to a wall element, the mounting bracket slidably attached to the enclosure so as to be moveable between the back and front of the enclosure and an adjustment mechanism rotatably attached to the enclosure and adjacent the mounting bracket, whereby rotation of the adjustment mechanism moves the enclosure with respect to the mounting bracket.

BRIEF DESCRIPTION OF THE DRAWINGS

Reference may be now had to the accompanying drawings in which.

DETAILED DESCRIPTION OF THE PREFERRED EMBODIMENT

Figure 1:
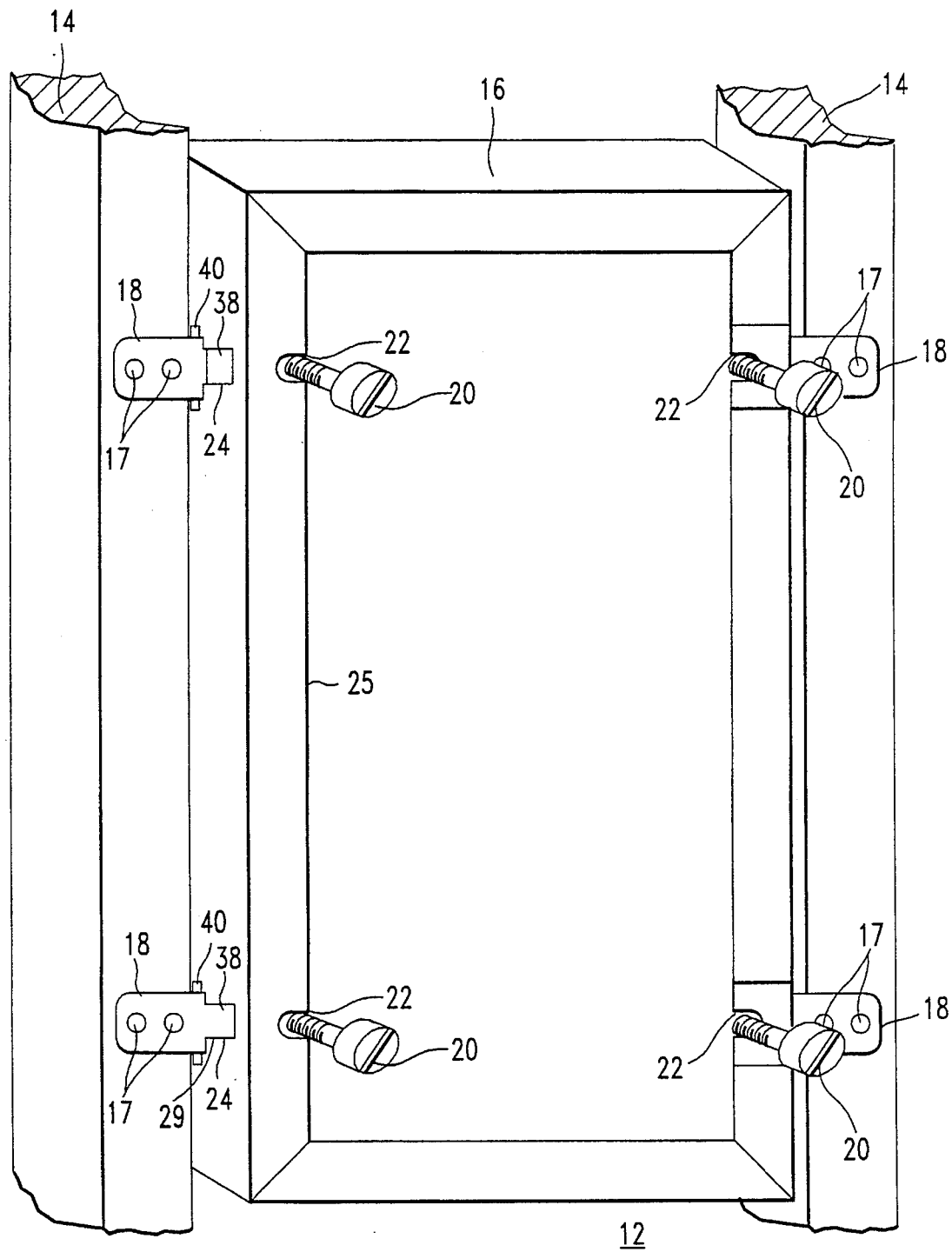
FIG. 1 is a perspective view of the load center enclosure of the present invention mounted between wall studs.

Refer now to FIG. 1 there is shown a perspective view of the adjustable load center of the present invention as actually mounted. More particularly, shown is an adjustable mounted load center 12. Disposed between wall studs 14 is a load center housing or enclosure 16. Attached to the wall studs 14 are adjusting brackets 18 having mounting holes 17 therein. It is to be understood that the wall studs 14 of the present invention may be wood, metal, masonry, or the like without departing from the spirit and scope of the present invention. As can be seen, the adjusting brackets 18 are disposed through inverted T shaped slots 24 disposed along the edge of load center enclosure 16. As such, these inverted T slots 24 have a vertical portion 38 and a perpendicularly positioned horizontal portion 40 (when reviewed in FIG. 4). It is to be understood that although four adjusting brackets 18 are utilized, the placement or number of the brackets may be varied in order to accommodate different enclosures, environments and the like without departing from the spirit and scope of the present invention.

Adjusting bracket 18, via its bracket recessed portion 29 is made to slide within vertical portion 38 back and forth thereby resulting in the movement of the enclosure with respect to wall studs 14. This is accomplished by use of double headed adjusting screws 20 (shown more fully in FIGS. 2, 3, and 4) which are disposed in flange slot recesses 22 of flange 25, which is adjacent inverted T slots 24. As discussed more fully below, the ends of double headed adjusting screws 20 are mated to that portion of adjusting bracket 18 which extends into the interior of enclosure 16.

Figure 2:
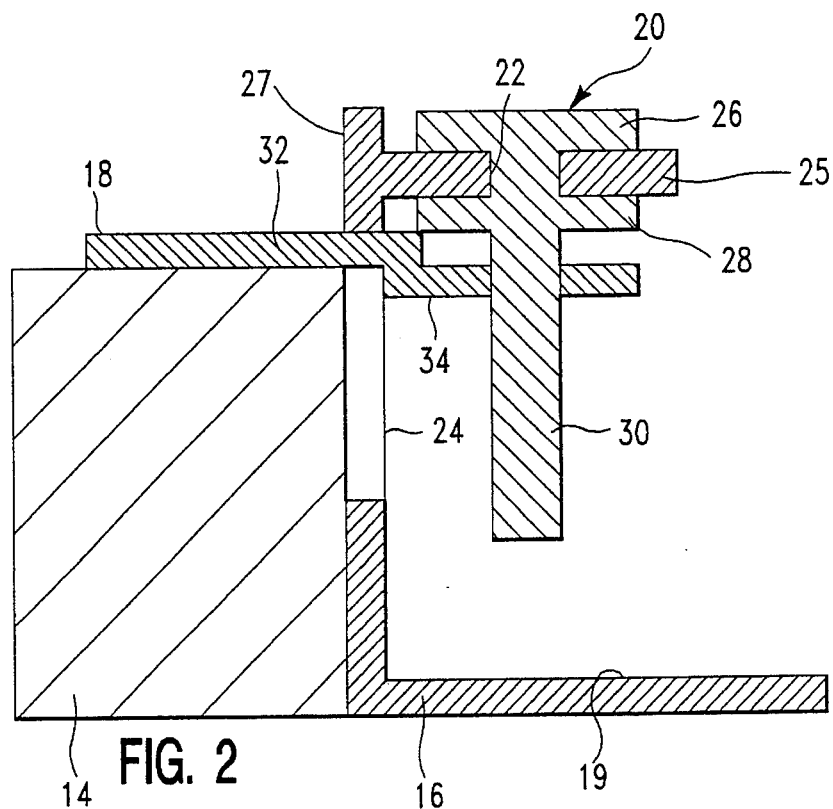
FIG. 2 is a cross-sectional view taken through one of the adjustable mounting brackets utilized with the present invention.
Figure 3:
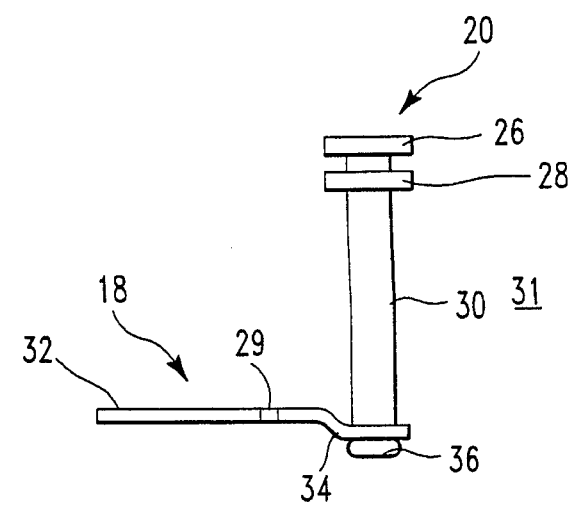
FIG. 3 is an elevational view of the adjustable mounting assembly utilized with the present invention.
Figure 4:
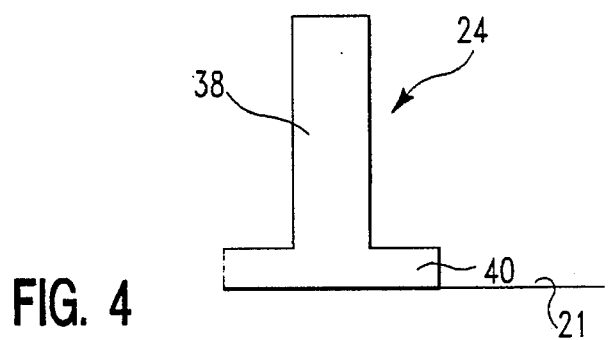
FIG. 4 is an elevational view of the adjusting slot utilized in the enclosure of the present invention.

Referring now to FIGS. 2, 3 and 4 there is shown a cross sectional view taken through one of the mounting brackets 18 of the present invention, attachment of the adjusting screw 18 to the adjusting bracket 18 and side view of the inverted T slots 24 respectively. More particularly, shown in cross section is load center housing 16 adjacent wall stud 14. As can be seen, load center housing 16 has a rear portion 19 and a side wall 21 which has disposed therein inverted T slots 24 (shown most clearly in FIG. 4). Also shown is flange slots or recesses 22 disposed in flange 25, while shown in more detail is double-headed adjusting screw 20 which is comprised of a top head 26 and a lower or bottom head 28 as well as a threaded portion 30 (shown in more detail in FIG. 3). Here it can be seen how the top and lower heads 26, 28 respectively of adjusting screw 20 are used to cause the adjusting screw 20 to be fixedly captured by flange slot or recess 22 disposed within flange 25. Also shown is bracket 18 which is offset in nature and comprised of a stud portion 32 and an offset screw retention portion 34. Threads 30 engage the aperture (not shown) contained in the offset screw retention portion 34.

Accordingly, it can be readily seen how rotation of adjusting screw 20 will cause bracket 18 to move up and down the threaded portion 30. Therefore, when stud portion 32 is fixedly attached to a wall stud 14, rotation of adjusting screw 20 by virtue of top and bottom heads 26, 28 respectively being captured with respect to flange 25 require that the entire enclosure 16 move. This therefore causes wall finish area 27 to be increased or decreased in order to accommodate different wall thicknesses. In this regard, bracket recess portion 29 (FIG. 1) will ride along or be guided by vertical portion 38 of inverted T slot 24. Therefore, by virtue of the bracket recess portion 29 formed in the stud portion of bracket 18, the load center housing 16 is effectively captured and guided in a relatively secure and fixed manner as wall finish area 27 is adjusted.

Referring now to FIG. 3 there is shown adjusting screw 20 as fixedly secured to bracket 18. In this regard, and in the preferred embodiment of the present invention, the lower portion of adjusting screw 20 is placed through an opening in offset screw retention portion 34 and swagged 36. This forms a bracket assembly 31 and is done so that the bracket and adjusting screw 18, 20 are fixedly secured to each other while still allowing screw 20 to rotate and is required in order to "capture" adjusting screw 20 with respect to bracket 18. It is to be understood however that other types of capturing mechanisms may be utilized such as a double head configuration such as is utilized at the top portion of adjusting screw 20 without departing from the spirit and scope of the present invention.

Referring now to FIG. 4 there is shown the side view of load center 16 in conjunction with the inverted T slot 24. There the vertical and horizontal portions 38, 40 are visible. In the preferred embodiment of the present invention, the inverted T slots 24 are provided as formed in place knock-out areas similar to that provided for electrical connectors in load centers as is readily known and available to one skilled in the art. In this fashion, in the event that the load center of the present invention is to be merely surface mounted, the rear panel 19 of the load center housing may either be provided with knock-outs or holes or may be drilled therethrough in order to facilitate attachment of the load center enclosure or housing 16 directly to the desired wall surface. Therefore, by providing inverted T slots 24 as merely knock-outs, undesirable and impermissible openings in the enclosure 16 are avoided.

Figure 5:
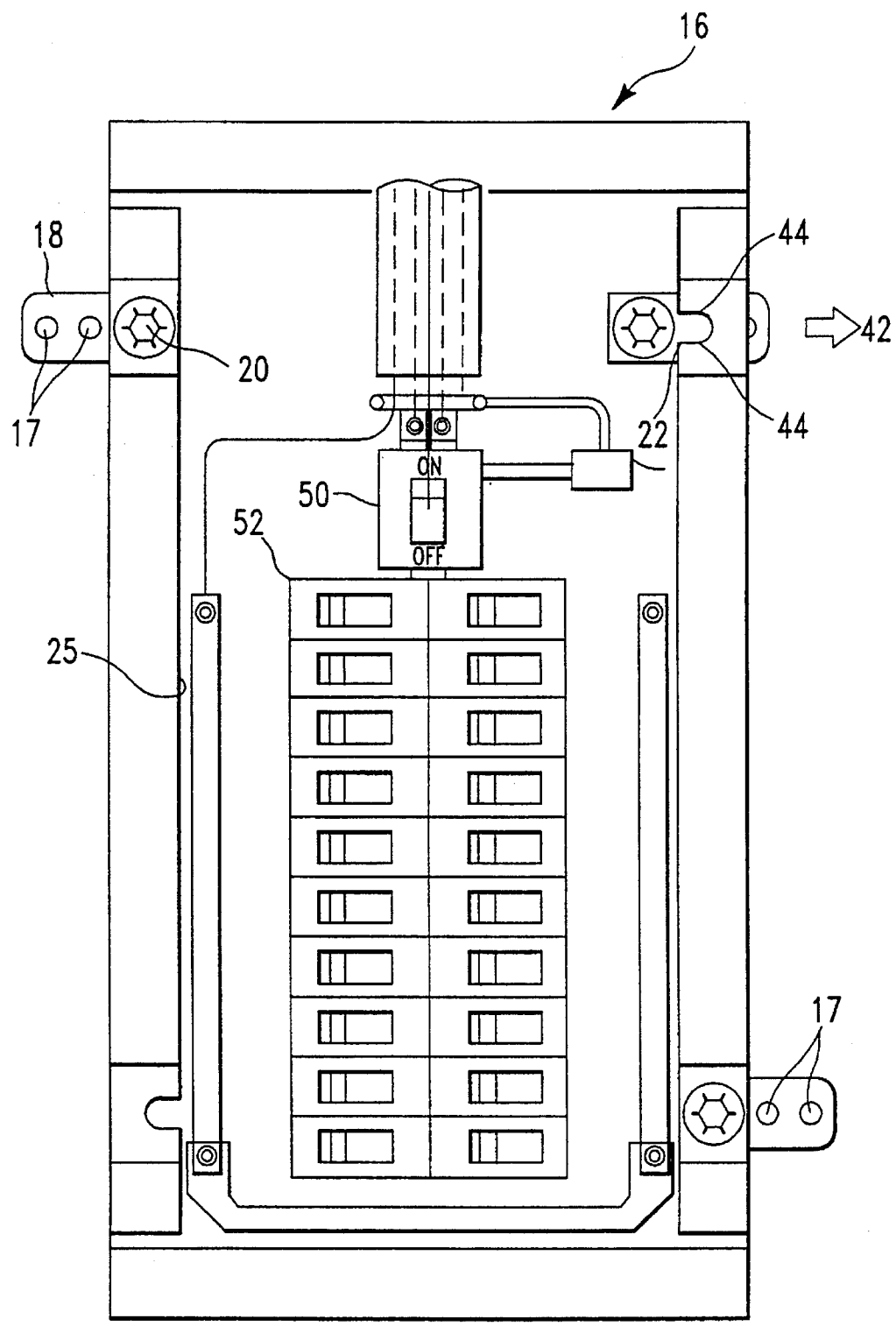
FIG. 5 is a plan view of the load center of the present invention indicating how the adjustment mechanism is attached thereto.

Referring now to FIG. 5 installation of the adjusting assembly as shown in FIG. 3 may be seen with the addition of a typical circuit breaker installation. Such installations are readily known and available to one skilled in the art and hence only a brief explanation will be given although reference may be had to U.S. Pat. No. 5,136,454. Accordingly, by way of example, the enclosure 16 has disposed therein an exemplary main circuit breaker 50 (which may include a disconnect switch-not shown) as well as individual circuit breakers 52. As Such, during installation the knockouts forming the inverted T shaped slots 24 would be removed. Thereafter, the bracket assemblies 31 (FIG. 3) would be held such that the adjusting screw 20 is held upward from the inside of the enclosure 16. Thereafter, the stud portion 32 of bracket 18 will be pushed through the horizontal portion 40 of inverted T slot 24 until the bracket recess portions 29 are aligned with the vertical portion 38. The bracket assembly 31 is then urged upwards towards the flange such that the double heads of adjusting screw 20 align with flange slots 22. Adjusting screw 20 is then be urged outward into an engagement direction 42 appropriate for its orientation with respect to the enclosure until it snaps into place in the flange slot recess 22 and rotatably held there by tangs 44 provided in flange slot recesses 22.

The installation procedure is repeated for all the bracket assemblies utilized. Thereafter, the enclosure 16 containing the bracket assembly 31 would be placed between the wall studs 14 and as previously mentioned suitably attached to the wall studs 14. Thereafter, upon installation of the appropriate wall material the enclosure 16 may have its depth adjusted with respect to the face of the wall finish simply by rotation of adjusting screw 20. In this regard, the horizontal portion 40 is sufficiently deep in enclosure 16 and vertical portion 38 is sufficiently long so as to provide the maximum desirable adjustment possible. Furthermore, it has been found by having an adjustment mechanism of this type when used with walls which are slightly "potato chipped" the enclosure may be adjusted so as to be conformably and accurately aligned with the wall surface.

It is to be understood that many variations of the present invention may be practiced without departing from the spirit and scope of the present invention. For example, the brackets may be of different configurations such as straight or more offset while the inverted T slots may be simply comprised of a simple vertical slot with the bracket placed through the vertical slot and then rotated about the recessed portion. Additionally, the tangs may be removed or other types of retention may be utilized, while the entire bracket assembly may be used external to the enclosure itself or outwardly placed flange recess areas could be used. Also, the present invention could be used as part of a junction/switch or receptal enclosure and therefore might use only one or two bracket assemblies.

What is claimed is:

1. An adjustable depth electrical enclosure, comprising:

an enclosure having an interior and opposing sides, a back and a front;

at least two mounting brackets for affixing said enclosure to a wall element, each of said mounting brackets slidably attached to said enclosure and each said bracket extending from outside said enclosure through an enclosure side and extending into the interior of said closure such that when said brackets are attached to the wall element, said enclosure is moveable with respect to said brackets in a direction between said back and said front of said enclosure; and an adjustment mechanism rotatably attached to said enclosure and adjacent each said mounting bracket, whereby rotation of said adjustment mechanism moves said enclosure with respect to said mounting brackets.

2. An adjustable depth electrical enclosure according to claim 1 wherein said adjustment mechanism is comprised a threaded bolt having a first head at one end thereof, said head rotatably attached about its axial length thereof to said enclosure, and a second end of said bolt further being rotatably attached about its axial length thereof to one end of each said mounting brackets.

3. An adjustable depth electrical enclosure according to claim 1 wherein said enclosure has two slots in at least one side thereof, and having a mounting bracket slidably disposed in each of said slots.

4. An adjustable depth electrical enclosure according to claim 3 wherein said mounting bracket has a narrow portion which is slidably disposable in said slot.

5. An adjustable depth electrical enclosure according to claim 3 wherein said slot is "T" shaped having its length extending from said front to said back of said enclosure.

6. An adjustable depth electrical enclosure according to claim 5 wherein said mounting bracket has a narrow portion which is slidably disposable in said length of said slot.

7. An adjustable depth electrical enclosure according to claim 1 wherein said enclosure is comprised of an electrical junction box.

8. An adjustable depth electrical enclosure according to claim 1 wherein said enclosure is comprised of an a panelboard load center.

9. An adjustable depth electrical enclosure according to claim 5 wherein said slot is a formed-in-place knockout.

10. An adjustable depth electrical enclosure according to claim 6 wherein each said mounting bracket is elongate and wherein said narrow portion is comprised of at least two opposing notches.

11. An adjustable depth electrical enclosure according to claim 2 wherein said threaded bolt has a second head axially disposed from said first head.

12. An adjustable depth electrical enclosure according to claim 11 wherein said enclosure has a flange disposed on at least one of said opposing sides and adjacent said front, said flange have an interior side facing said back of said enclosure and an opposing second side, said flange further having at least one recess therein, wherein said threaded bolt is disposable in said recess such that said second head is adjacent said interior side of said flange and said first head is adjacent said opposing second side of said flange such that said threaded bolt is rotatably retained by said recess.

13. An adjustable depth electrical enclosure according to claim 1 wherein said mounting bracket is disposed on the exterior of said enclosure.

14. A adjustable depth electrical enclosure according to claim 1 further comprising circuit breakers disposed in said enclosure.

15. An adjustable depth electrical enclosure according to claim 1 wherein said each of said mounting brackets are opposite each other in said sides of said enclosure.

16. An adjustable depth load center electrical enclosure, comprising:

a load center enclosure having opposing sides, a back and a front, said enclosure having a "T" shaped formed-in-place knockout slot in at least two of said opposing sides thereof, said "T" shaped slots having their length extending from said front to said back of said enclosure, said enclosure further having a flange disposed on at least one of said opposing sides and adjacent said front, said flange have an interior side facing said back of said enclosure and an opposing second side, said flange further having at least one recess therein;

at least two elongate mounting brackets each of which extends through each said "T" shaped slots and having a first portion at one end thereof for affixing said enclosure to a wall element, an opposing end and a narrow portion disposed intermediate of said first one end and said opposing end, said narrow portion comprised of at least two opposing notches, wherein said opposing notches are slidably disposable in said slot such that when said brackets are attached to the wall element, said enclosure is moveable with respect to said brackets in a direction between said back and said front of said enclosure; and an adjustment mechanism comprised of a threaded bolt having a first head at one end thereof and a second head axially disposed from said first head, said second head disposed adjacent said interior side of said flange and said first head is adjacent said opposing second side of said flange such that said threaded bolt is rotatably retained by said recess and wherein the end of said bolt axially disposed from said first head being rotatably attached to said opposing end of each said bracket whereby rotation of said adjustment mechanism moves said enclosure with respect to said mounting brackets.

17. A adjustable depth load center electrical enclosure according to claim 16 further comprising circuit breakers disposed in said enclosure.

18. An adjustable depth load center according to claim 16 wherein said second slot and said mounting bracket are disposed in sides which are opposite to each other in said enclosure.

* * * * *